Aug. 14, 1923.
F. H. CRAGO
1,464,748
ANIMAL TRAP
Filed March 11, 1922
2 Sheets-Sheet 1
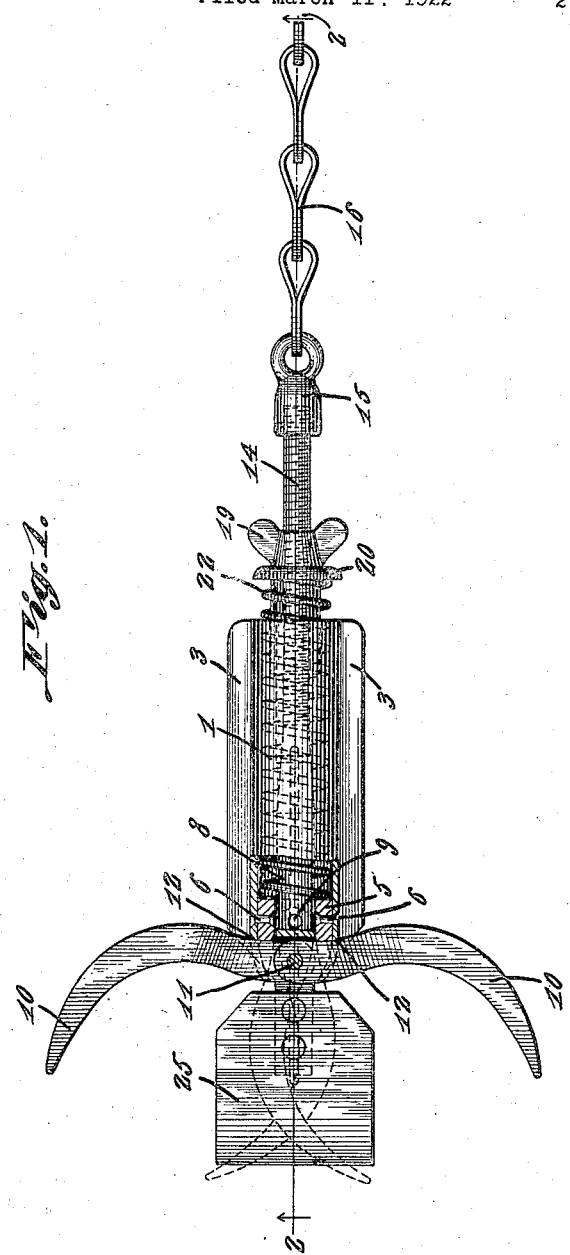
F. H. Crago, Inventor Aug. 14, 1923.
F. H. CRAGO
ANIMAL TRAP
Filed March 11, 1922
1,464,748
2 Sheets—Sheet 2
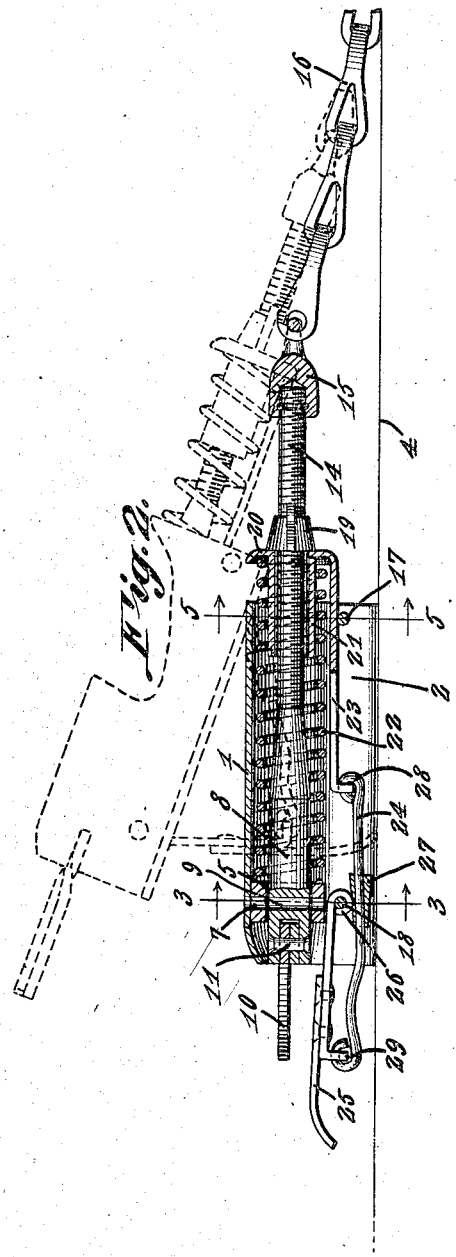
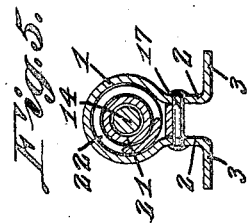
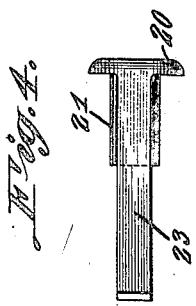
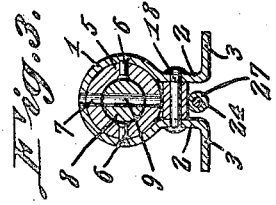
F. H. Crago, Inventor
By [signature] Attorney Patented Aug. 14, 1923.

1,464,748

UNITED STATES PATENT OFFICE.

FELIX H. CRAGO, OF MILLTOWN, MONTANA, ASSIGNOR OF ONE-HALF TO SOLFEST N. STENSON, OF MISSOULA, MONTANA.

ANIMAL TRAP.

Application filed March 11, 1922. Serial No. 543,038.

*To all whom it may concern:*

Be it known that I, FELIX H. CRAGO, a citizen of the United States, residing at Milltown, in the county of Missoula and State of Montana, have invented a new and useful Animal Trap, of which the following is a specification.

The device forming the subject matter of this application is a trap, and one object of the invention is so to construct the trap that, when the same is sprung, the trap will rise, thereby enabling the jaws of the trap to attain a secure hold on the leg of the animal. A further object of the invention is to provide novel means for adjusting the trigger of the trap. A further object of the invention is to provide novel means for operating and controlling the jaws.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in plan, a trap constructed in accordance with the invention, parts being broken away; Figure 2 is a longitudinal section wherein parts appear in elevation; Figure 3 is a cross section on the line 3—3 of Figure 2; Figure 4 is a plan showing the slide; Figure 5 is a cross section on the line 5—5 of Figure 2.

The trap forming the subject matter of this application comprises a tubular body 1 having depending side walls 2 provided with outstanding flanges 3, the flanges being adapted to support the trap, when set, in a horizontal position, on the surface of the ground indicated at 4. The flanges 3 are united by connections 17 and 18, which may be rivets. An annular guide and abutment 5 is located in the body 1 adjacent to the forward end thereof, and is held in place by securing elements 6. The guide 5 and the upper portion of the body 1 are supplied with registering openings 7.

The numeral 8 marks a plunger, located in the body 1, and mounted for longitudinal reciprocation in the guide 5, the plunger having an opening 9 which is adapted to be brought into registration with the openings 7 when the trap is set. A pair of curved jaws 10 are provided, the jaws being united at their rear ends, by means of a pivot element 11, with the forward end of the plunger 8, the jaws working in notches 12 formed in the side walls of the body 1. The plunger 8 has a reduced rear end 14, which is threaded. A swivel 15 is connected to the end 14 of the plunger 8 and carries a chain 16 or the like, whereby the trap may be anchored, in accordance with the common practice.

An operating member, in the form of a nut 19, is threaded on the end 14 of the plunger 8. In advance of the nut 19 is disposed an abutment or slide, shown in detail in Figure 4 and appearing clearly in Figure 2. The abutment is a composite structure and includes a cup-shaped disk 20 from which a sleeve 21 projects, the disk engaging the nut 19 and the sleeve 21 being mounted slidably on the reduced end 14 of the plunger 8. An arm 23 projects forwardly from the disk 20. A compression spring 22 is disposed in the body 1 and surrounds a portion of the plunger 8 and a portion of its reduced end 14, one end of the spring being adapted to cooperate with the guide and abutment 5, the other end of the spring being adapted to cooperate with the disk 20.

The numeral 24 marks a link, one end of which is pivoted at 28 to the forward end of the arm 23, as shown at 28, the forward end of the link 24 being pivoted at 29 to the intermediate portion of a trigger 25, the rear end of the trigger terminating in a bearing 26, mounted on the connection 18, the construction being such that the trigger 25 may swing vertically. An adjusting member 27 is mounted for sliding movement on the trigger 25 and is of tapered or wedge-like form.

In practical operation, the nut 19 is moved to the right (Figure 2) until the spring 22 is set free. Thereupon the plunger 8 is moved forwardly, the jaws 10 being swung into the open position shown in Figure 1 of the drawings. For the sake of safety to the operator, a pin (not shown) may be inserted into the registering openings 7 and 9 shown in Figure 2. The nut 19 then is moved to the left and the spring 22 is put under compression. The slide or abutment, including the disk 20, the sleeve 21 and the arm 23, move forwardly, the link 24 is moved forwardly and the trigger 25 is swung into the forwardly presented position shown in Figure 2, the pivotal connection 29 between the link 24 and the trigger 25 being slightly above the line joining the connection 18 with the point of pivotal union 28 between the link 24 and the forward end of the arm 23, the trap, therefore, remaining set. The pin (not shown) which is inserted into the openings 7 and 9 is withdrawn, the body 1 of the trap thus being in the horizontal position shown in Figure 2 of the drawings.

When an animal treads on the trigger 25, the trigger is carried downwardly until the pivot point 29 is below a line joining the pivot point 28 with the connection 18, whereupon, the spring 22 will reassert itself, the plunger 8 being carried rearwardly, the jaws moving into the crossed dotted line position of Figure 1, and the leg of the animal being carried backwardly between the jaws. The trigger 25 swings downwardly, into engagement with the ground, and into the dotted line position of Figure 2, the forward end of the body 1 and the jaws 10 being carried upwardly. The result is that the jaws 10 acquire a firm hold on the leg of the animal, well above the foot, and it will be practically impossible for the animal to jerk its foot out from between the jaws 10.

The trap is so constructed that, upon the one hand, a considerable pressure may be required on the trigger 25 in order to spring the trap: and, upon the other hand, the parts of the trap may be so arranged with respect to each other that the slightest pressure on the trigger 25 will spring the trap. This result is brought about by the tapered adjusting member 27, it being obvious that, the more that the adjusting member 27 is moved to the left (Figure 2) the closer will the pivot point 29 approach a line joining the connection 18 with the pivot point 28, the trap being sprung easily, when the pivot point 29 is closely adjacent to the said line, and the trap being sprung with increasing difficulty, as the vertical distance of the pivot point 29 above the said line increases.

Having thus described the invention, what is claimed is:

1. A trap comprising a body; a plunger slidable in the body; jaws carried by the plunger and closed when the plunger is retracted; a trigger pivoted to the body; means for connecting the trigger to the plunger; and a spring which is compressed when the plunger is advanced, the spring constituting means for retracting the plunger, and constituting means for swinging the trigger downwardly thereby to effect a raising of the forward end of the body and the jaws when the trap is sprung.

2. A trap comprising a body; a plunger slidable in the body; jaws carried by the plunger and closed when the plunger is retracted; a trigger pivoted to the body; a slide mounted for adjustment on the plunger; means for holding the slide in adjusted positions on the plunger; means for connecting the slide with the trigger; and a spring interposed between the slide and a portion of the body, the spring constituting means for retracting the plunger, and constituting means for swinging the trigger downwardly thereby to effect a raising of the forward end of the body and the jaws when the trap is sprung.

3. A trap comprising a body; a guide in the body; a plunger slidable in the guide; jaws carried by the plunger and closed when the plunger is retracted; a trigger pivoted to the body; a slide adjustable longitudinally of the plunger; a compression spring interposed between the slide and the guide; means for holding the slide in adjusted positions on the plunger; and a link pivotally connected with the slide and with the trigger.

4. A trap comprising a body; a plunger slidable in the body; jaws pivoted to the plunger and closed when the plunger is retracted; spring means for retracting the plunger; a trigger; a pivotal connection between the trigger and the body; a link pivoted to the trigger; means for connecting the link to the plunger; and an adjusting member movable upon the link to assume a position in contact with said pivotal connection, thereby to adjust the position of the trigger.

5. A device of the class described, constructed as set forth in claim 4, and further characterized by the fact that the adjusting member is tapered.

6. A trap comprising a body; a plunger slidable in the body; jaws pivoted to the plunger and closed when the plunger is retracted; spring means for retracting the plunger; a trigger; a link pivoted to the trigger; means for connecting the link to the plunger; and means adjustable along the link for varying the position of the trigger.

In testimony that I claim the foregoing as my own, I have hereto affixed my signature in the presence of two witnesses.

FELIX H. CRAGO.

Witnesses:
 EARNEST H. WHISLER,
 FRED H. WHISLER.